Sept. 9, 1958  C. S. MORRISON ET AL  2,851,190
SEEDING DEVICE
Filed Aug. 19, 1955

INVENTORS.
CHARLES S. MORRISON
GEORGE H. SHRIVER
BY
ATTORNEYS

United States Patent Office 2,851,190
Patented Sept. 9, 1958

2,851,190

SEEDING DEVICE

Charles S. Morrison, Moline, and George H. Shriver, Silvis Heights, Ill., assignors, by mesne assignments, to Deere & Company, a corporation of Illinois Application August 19, 1955, Serial No. 529,401

18 Claims. (Cl. 221—233)

The present invention relates generally to agricultural implements and more particularly to planting implement of the type that includes a seed-selecting unit.

The object and general nature of the present invention is the provision of a new and improved seeding device attachable to the bottom of a seed hopper and so constructed and arranged that relatively large seeds, such as peas, beans, and the like, are effectively handled, preferably by means providing for single seed selection. Another feature is the provision of a plurality of such devices for attachment to the elongated seed box of a grain drill or the like.

A further feature of this invention is the provision of a seed wheel construction in which the seed wheels may readily be removed from the associated housing, as for purposes of cleaning the seed wheel and associated parts at the end of the day. More specifically, it is a feature of this invention to provide a seed wheel housing and a removable seed wheel construction having retractable hubs whereby, by displacing the hubs laterally inwardly of the housing, each wheel may be dropped from the associated housing as a unit, not only for the purpose of cleaning and replacing the wheel, but also for the purpose of substituting other wheels particularly designed to handle other kinds of seed.

It is also a feature of this invention to provide a particular kind of seed wheel in which two sets of peripheral seed cells are provided, with a dividing radially outwardly extending rib or flange disposed in a plane between the planes of the two sets of seed cells, the flange serving as dividing means to prevent seed from one set of cells from interfering with the seed from the other set.

These and other objects and advantages of the present invention will be apparent to those skilled in the art after a consideration of the following detailed description, taken in conjunction with the accompanying drawings, in which:

Fig. 1 is a side view of a planting device in which the principles of the present invention have been incorporated, certain portions being shown in section to facilitate an understanding of the present invention.

Fig. 2 is a sectional view taken principally through the seeding wheel and showing in particular the retractable hubs on which the seed wheel rotates within the housing.

Fig. 3 is a fragmentary perspective view of the two sections of the seed wheel of the present invention and the two cooperating cut-off members.

Fig. 4 is a fragmentary sectional view taken generally along the line 4—4 of Fig. 1.

Fig. 5 is a fragmentary sectional view taken generally along the line 5—5 of Fig. 1.

Fig. 6 is a detail enlarged sectional view taken generally along the line 6—6 of Fig. 2.

The present invention has been illustrated in the drawings as incorporated in seeding devices, each in the nature of a seed wheel and housing attachment, for grain drills whereby the latter may be utilized for the precision planting of relatively large seeds, such as peas, beans, and the like.

The principal parts of the seeding attachment of the present invention comprise a housing 10, preferably formed of right- and left-hand parts 11 and 12 that may be of like construction except that one is right-hand and the other is left-hand, and a seed wheel unit 13 rotatable within the housing and also extending into the hopper 14 that forms a part of the grain drill. It will be understood that a plurality of housings 10 and associated seed wheels 13 will be attached to the bottom of the hopper 14. Each of the housings 10 is provided with apertured lugs 16 and 17 by which the housings may be securely fixed to the bottom of the hopper by the same bolts or other fasteners that are used to fasten conventional seed selecting units to the hopper.

Each housing 10 is made up of interconnected sections 11 and 12, as mentioned above, and the latter parts are shaped to form side walls 21 and 22 that are apertured, as at 23 and 24, to provide means to rotatably receive a seed-selecting wheel unit, such as the wheel 13 mentioned above. The rear portions of the side walls 11 and 12 of the housing 10, which form a seed tube, will be described in detail later.

Each of the seed wheels 13 is made up of a central wheel member 27 and two substantially identical wheel side members 28. The side members 28 are apertured, as at 31, and the central section 27 is apertured, as at 32, whereby the three parts may readily be secured together by any suitable fasteners, such as a plurality of rivets 34. The central wheel member 27 is provided with a radially extending seed dividing rib 36 and, at opposite sides thereof, two sets of half cell recesses 41 and 42. The two side members 28 are of similar construction, in that each is provided with a set of half cell recesses 43. The sets of cells 41 and 43 at one side of the dividing rib 36 form complete seed-receiving recesses that are offset in a peripheral direction from similar seed-receiving recesses formed by the cooperating half cell recesses 42 and 43 at the opposite side of the rib 36. A radially inwardly extending groove 45 serves to divide the sets of half cells 41 and 43, and at the other side of the rib 36 a groove 46 divides the other sets of half cells 42 and 43. Seed-ejecting means, referred to below, operate in these grooves, as will be explained later.

Each seed wheel side member 28 is provided with a laterally outwardly disposed cup-shaped extension 48 that is apertured centrally, each extension 48 having a radially inwardly extending rib or flange 49. The cup-shaped extensions 48 cooperate with the central part of the web portion 51 of the central member 27 to form a hollowed interior in the seed wheel 13. The central web portion 51 is provided with a polygonal opening 52 to receive a driving shaft 53 or other suitable means by which the wheel 13 is rotated. While the shaft 53 is shown as square in section, the shaft may be round and the seed wheels fixed thereto by key or other removable or disconnectible securing means, as desired.

The wheel 13 carries hub means in the form of a pair of axially outwardly extending hub members 55 rotatably mounted in the apertured parts 11 and 12, and the inner ends of the hub members 55 extend into the hollowed portion of the wheel body and carry radially outwardly extending flanges 56. The inner face of each hub is provided with a circular groove 57 that receives an associated coil spring 58, the inner end of which bears against the adjacent side of the apertured central portion of the central wheel member 27 while the outer end of each spring 58 is nested into the associated groove 57. The springs 58 thus yieldably urge the hub members 55 axially outwardly of the wheel body, which outward movement is limited by the contact of the hub flanges 56 with the flanges 49 on the side members 28 of the seed wheel 13. The hub members 55 are held against rotation relative to the seed wheel 13 by virtue of a rib or key 60 on the inner surface of each cup-shaped extension 48, as best shown in Figs. 2 and 6, and a slot 61 is formed in each flange 56, to receive the associated rib or key 60.

The parts are so constructed and arranged that the hub members 55 may be pressed inwardly by hand until the axially outer ends of the hub members are flush with the axially inner portions of the extensions 48, and the latter are spaced apart axially substantially the same distance as the distance between the inner faces of the side walls 21 and 22 of the housing sections 11 and 12. Thus, with the retractable hubs 55 held in their inner or retracted position, so that the outer ends of the hub members 55 clear the inner faces of the walls 21 and 22 the seed wheel 13 may be readily be passed into position into the housing 10 or removed therefrom, as desired. It will be understood, of course, that for any one seeding planter, there will be a plurality of housings attached to the hopper and the corresponding number of seed wheels, and that before the seed wheels, or any one of them, can be installed or removed, the driving means, such as a shaft 53, must be removed from the housings 10 to permit displacement of the associated wheel unit or units 13 in a radial direction.

A pair of cut-off levers 62 are pivoted, as on a pin 63 carried by the housing 10, so as to lie on opposite sides of the dividing rib or flange 36. The nose portions 64 of the cut-off levers 62 ride along the outer or peripheral portion of the wheel 13, just above the seed cells therein, and act to prevent more than one seed from entering any one cell. The cut-off levers 62 are extended below the pivot 63 to form tail portions 66 that receive one end of a spring member 67, the other end of which is disposed in an opening formed in an adjacent portion of the housing. The springs 67 thus urge the nose portions 64 toward the seed cells but the movement of the levers 62 in this direction is limited by an adjusting cam 68, one of which is provided for each of the levers 62. The several adjusting cams 68 are mounted on a rod or shaft 71 that extends the length of the hopper, and each cam 68 is mounted individually on the rod or shaft 71 and secured in position thereon by a set screw 73. The rod member 71 is supported in any suitable way in arms 74, one of which is carried on each housing 10. The rod 71 is held in a different position of adjustment by any suitable means, and by turning the rod in one direction or the other, the nose portions 64 of the several cut-off levers are raised or lowered relative to the seed cells, thus adjusting the apparatus for handling larger or smaller seeds, as necessary.

Each housing 10 carries a pair of fixed knock-out or ejector plates 77, the latter being carried in any suitable way by the housing 10 and each has a generally vertically arranged curved section 78 that is disposed at the rear side of the wheel and lies in the associated groove 45 mentioned above. The ejector plates 77 are arranged closely adjacent the cut-off levers 62 and at the upper portion of a seed tube section 79 that is formed as a part of the housing 10 and extends downwardly at such an angle that the normal trajectory of a seed ejected by the knock-out plate section 78 falls within the passage of the seed boot section 79, with the result that the seeds fall freely and they do not contact the wall portions of the seed tube or adjacent parts under ordinary conditions. The rib 36, which, as shown particularly in Fig. 5, extends radially outwardly a distance equal approximately to the depth of a seed cell, acts as divider means and keeps the seeds ejected from the cells at one side of the seed wheel from colliding with the seeds ejected from the cell at the other side of the seed wheel.

The ejector plates 77 are preferably held in position within the housing 10 by one of the bolts 81 that secure the two parts of the housing together, the rear edge 82 of each plate being held in contact with an adjacent wall of the seed tube or boot section 79, whereby the one fastener 81 holds the members 77 against displacement. The members 77 are held in their proper position laterally by a spacing block 83 that is disposed between the member 77 and mounted on the connecting bolt 81.

While we have described above and shown in the drawings the preferred structure in which the principles of the present invention have been incorporated, it is to be understood that our invention is not to be limited to the particular details shown and described above but that, in fact, widely different means may be employed in the practice of the broader aspects of our invention.

What we claim, therefore, and desire to secure by Letters Patent is:

1. A seeding device comprising a housing having apertured side wall portions spaced apart laterally, said housing being open at one portion between said side wall portions, a celled seed wheel disposed in said housing between said side wall portions, and axially shiftable hub means carried by said wheel and having portions disposed rotatably in said apertured wall portions, said hub means including a pair of axially aligned hubs spaced apart at their adjacent portions whereby the hubs are axially shiftable toward one another, the spacing being such that the hubs are shiftable inwardly by an amount such that when the hubs are shifted toward one another the distance between the outer ends of said hubs is less than the distance between said wall portions, whereby when said hubs are so shifted axially inwardly the seed wheel is releasable from said housing through said open portion between said wall portions.

2. A seeding device comprising a housing open at one portion and having apertured side wall portions spaced apart laterally, a celled seed wheel disposed in said housing between said side wall portions, axially shiftable hub means carried by said wheel and having portions disposed rotatably in said apertured wall portions, said hub means being displaceable laterally inwardly to release said seed wheel from said housing, and spring means bearing against the inner ends of said hub means for urging them axially outwardly.

3. A seeding device comprising a housing open at one portion and having apertured side wall portions spaced apart laterally, a celled seed wheel disposed in said housing between said side wall portions, said seed wheel having apertured laterally spaced apart side walls and a generally central wall disposed between said apertured side walls, axially shiftable hub means carried by said wheel and having portions disposed rotatably in and extending laterally outwardly through said apertured wall portions, and a pair of springs acting between said generally central wall and said axially shiftable hub portions, respectively, for urging the latter axially outwardly, said hub means being displaceable laterally inwardly to release said seed wheel from said housing.

4. The invention set forth in claim 3, further characterized by driving means extending through said hub portions and said central wall, and means connecting the latter wall with said driving means.

5. The invention set forth in claim 3, further characterized by a polygonal drive shaft extending through said hub portions and said central wall, the latter having a polygonal opening drivingly receiving said shaft.

6. A seeding device comprising a housing open at one portion and having apertured side wall portions spaced apart laterally, a celled seed wheel disposed in said housing between said side wall portions, a pair of axially shiftable hubs disposed for rotation in and extending axially outwardly of said apertured side wall portions, spring means bearing against the laterally inner ends of said hubs for urging them laterally outwardly, said hubs being displaceable laterally inwardly to release said seed wheel from said housing, and radially outwardly extending flanges on the inner ends of said hubs for limiting their axially outward movement.

7. A seeding device comprising a housing open at one portion and having apertured side wall portions spaced apart laterally, a celled seed wheel disposed in said housing between said side wall portions, and also having laterally spaced apart side walls, a pair of axially shiftable hubs carried by said seed wheel and having portions extending axially outwardly through the side walls of said seed wheel and through the side wall portions of said housing, and spring means bearing against said hubs to urge them axially outwardly but accommodating inward shifting of said hubs.

8. A seeding device as defined in claim 7, further characterized by means on said hubs cooperating with said seed wheel side walls limiting outward movement of said hubs.

9. In a seeding device releasably attachable to a housing having spaced apart side walls having aligned hub-receiving apertures, a seed wheel comprising a rotary part having a set of peripheral seed cells and a generally hollow central portion, and a pair of axially shiftable hubs carried by said central portion, the inner portions of said hubs lying within said hollow central portion in spaced apart relation and the outer ends of said hubs lying laterally inwardly of the inner faces of said housing side walls when said hubs are shiftable inwardly into said hollow central portion of the seed wheel, thus providing for passing said seed wheel into or removing it from said housing.

10. A seed wheel as defined in claim 9, further characterized by means on said hubs and the side walls of said seed wheel to restrain said hubs from rotating relative to said seed wheel side walls.

11. In a seeding device releasably attachable to a housing having spaced apart side walls having aligned hub-receiving apertures, a seed wheel comprising a rotary part having a set of peripheral seed cells and a generally hollow central portion, a pair of axially shiftable hubs carried by said central portion for passing said seed wheel into or removing it from said housing, and means on said hubs and the side walls of said seed wheel to restrain hubs from rotating relative to said seed wheel side walls, said hub restraining means comprising key and slot means formed on said hubs and the adjacent portions of said seed wheel side walls.

12. A seed wheel comprising a rotary part having a set of peripheral seed cells and a generally hollow central portion, and a pair of axially shiftable hubs carried by said central portion and said hubs being retractable into said central portion so as to provide for passing said seed wheel into or removing it from said housing, said rotary part including a central member and two side members, each of the latter including a laterally outwardly extended hollow section provided with a radially inwardly extending flange, and each of said hubs including an inner end having an outwardly extending flange cooperating with the associated inwardly extending flange to limit axially outward movement of the hub.

13. In a seeding device, a seed wheel comprising a central member and two side members, said central member having a shaft opening and each side member having a hub-receiving opening, an axially movable hub member disposed in the opening in each side member, a coil spring acting between the central member and each side member, each hub member having a central opening aligned with the opening in said central member, means fixing said central and side members together, and drive shaft means extending through said hub openings and through said shaft opening.

14. In a seeding device, a seed wheel comprising a central member and two side members, means securing the side members to opposite sides, respectively, of said central member, half cell recesses formed on the peripheral portion of said central member at opposite sides of the latter, half cell recesses formed on the laterally inner side of each of said side members facing and cooperating with the half cell recesses formed on said central member, the latter member having a dividing rib extending radially outwardly from the peripheral portion of said central member between the recesses formed thereon.

15. In a seeding device, a generally vertical seed wheel comprising a rotatable member having two peripheral sets of seed cells arranged in laterally spaced apart relation around the circumference of said wheel, the latter being provided with a rib extending circumferentially about said wheel between the sets of seed cells, said rib extending radially outwardly beyond said sets of seed cells a distance equal at least approximately to the depth of one of said cells, a housing enclosing said seed wheel and including a seed boot section extending from generally the upper portion of the wheel downwardly in approximately tangential relation, whereby said rib serves to prevent interference of the seeds from one set of cells with the seeds from the other set, both sets of seed cells being constructed and arranged to deliver seed into said seed boot section.

16. The invention set forth in claim 15, further characterized by said seed boot section including a generally vertical passage opening forwardly at the upper portion of the housing, said seed-dividing rib extending generally rearwardly into said passage.

17. In a seeding device, a generally vertical seed wheel comprising a rotatable member having two peripheral sets of seed cells arranged in laterally spaced apart relation around the circumference of said wheel, the latter being provided with a rib extending circumferentially about said wheel between the sets of seed cells, said rib extending radially outwardly beyond said sets of seed cells a distance equal at least approximately to the depth of one of said cells, a housing enclosing said seed wheel and including a seed boot section extending downwardly generally tangentially of the wheel, whereby said rib serves to prevent interference of the seeds from one set of cells with the seed from the other set, said seed boot section including a generally vertical passage opening forwardly at the upper portion of the housing, said seed-dividing rib extending generally rearwardly into said passage, generally vertically disposed seed ejecting means fixed at their lower ends to said housing and extending at their upper ends into the seed cells generally adjacent the upper portion of said passage.

18. A seeding device comprising a housing having apertured side wall portions spaced apart laterally, there being an open space at one side of the housing between said wall portions, a seed wheel disposed between said side wall portions and smaller than said open space so as to be capable of being passed therethrough, said seed wheel also being apertured, shaft means removably disposed in the aperture of said seed wheel and said apertured side wall portions, said seed wheel being removable through said space after said shaft means has been removed from said housing, and means shiftably mounted on the seed wheel and disengageably connected with said housing to releasably support said seed wheel in said housing after the shaft means has been removed therefrom.

References Cited in the file of this patent

UNITED STATES PATENTS

| | | |
|---|---|---|
| 157,015 | Marlay et al. | Nov. 15, 1874 |
| 564,424 | Ham | July 21, 1896 |
| 1,997,791 | Hoberg et al. | Apr. 16, 1935 |
| 2,174,120 | Cobbley et al. | Sept. 26, 1939 |
| 2,440,846 | Cannon | May 4, 1948 |